United States Patent [19]
Radue et al.

[11] Patent Number: 5,879,043
[45] Date of Patent: Mar. 9, 1999

[54] VEHICLE FOLDING REAR SEAT BACK WITH SIDE PULL INTERIOR LATCH RELEASE

[75] Inventors: Alan Joseph Radue, Clinton Township, Macomb County; Susan Moran Campbell, Harper Woods, both of Mich.

[73] Assignee: Lear Corporation, Southfield, Mich.

[21] Appl. No.: 917,525

[22] Filed: Aug. 26, 1997

[51] Int. Cl.⁶ ............................................. B60N 2/02
[52] U.S. Cl. .............................. 296/65.17; 297/378.13; 297/378.1
[58] Field of Search .................... 297/378.13, 378.12, 297/378.1; 296/65.16, 65.17

[56] References Cited

U.S. PATENT DOCUMENTS

| | | | |
|---|---|---|---|
| 4,484,776 | 11/1984 | Gokimoto | 296/65.17 X |
| 4,721,338 | 1/1988 | Kondo | 297/378.13 |
| 4,880,264 | 11/1989 | Yamazaki et al. | 296/65.17 X |
| 4,904,003 | 2/1990 | Yamazaki et al. | 296/65.17 X |
| 5,662,369 | 9/1997 | Tsuge | 297/378.13 X |
| 5,741,046 | 4/1998 | Leuchtmann et al. | 297/378.13 |

OTHER PUBLICATIONS

GM 1997 Service Manual GMP/97–LN–1 "Seats and Carpet" pp. 10–10–14 and 10–10–15.

*Primary Examiner*—Laurie K. Cranmer
*Attorney, Agent, or Firm*—Brooks & Kushman P.C.

[57] ABSTRACT

An interior release for a split, rear folding seat back having a center mounted latch with a flexible cloth side pull tether that wraps around the side edge of the seat back, remote from the latch. A specially designed cable mounting box fixed to the rear of the seat back, near the side edge, translates the pull of the flexible tether ninety degrees around into a stiff cable wire routed along the seat back rear surface to release the latch.

3 Claims, 4 Drawing Sheets

VEHICLE FOLDING REAR SEAT BACK WITH SIDE PULL INTERIOR LATCH RELEASE

TECHNICAL FIELD

This invention relates to fold down vehicle rear seat backs in general, and specifically to such a seat back with a side pull interior release assembly.

BACKGROUND OF THE INVENTION

In order to temporarily enlarge the trunk space, newer automotive vehicles may incorporate a fold down rear seat back, often divided into two separate fold down seat backs of differing width. The rear surfaces of the seat backs are releasably latched to a cross member of the vehicle body, sometimes called a "package shelf", that runs behind the seat backs, between them and the trunk space. The latches can be released to fold the seat back down by an exterior cable release, accessible only from within the trunk space. It is also convenient if a second, interior seat back latch release is provided, which can be accessed from the rear seat space. The latch mechanism is fixed to the seat back, and clamps around a striker fixed to the package shelf. It is desirable that the latches be located, on the seat back, where they can most efficiently retain the seat backs firmly in their raised, latched positions, so as to best resist the forces of cargo within the trunk space pushing against the seat backs. The optimum location for seat back retention puts the latch near the center of the seat back, remote from the outboard side edge of the seat back. The optimum latch location in terms of ease of release, however, depends on the type of release mechanism used. If a rigid, push down plunger type of release mechanism is used, then the latch can be placed near the center of the upper edge of the seat, which is also the best latch location in terms of seat back retention strength. However, plunger type mechanisms create a visible, solid intrusion into the rear seat space, and can tend to wrinkle the seat back upholstery near the top edge. Soft, flexible, cloth tether type pull handles are physically non intrusive, and potentially visually neutral, if color matched to the upholstery. If such tethers are located near the outboard side edge of the seat back, then they are easily accessed and pulled. However, known cloth loop tethers used in such a location require that the latch be located right at or very near the outboard side edge of the seat back as well, not remotely, so that they can be directly released by the tether. This is not the optimum latch position for seat back retention strength.

SUMMARY OF THE INVENTION

The subject invention discloses a folding seat back latch release assembly that allows the latch to be mounted near the center of the seat back, or at least remote from the outboard side edge of the seat back, but still be released by a flexible cloth tether located conveniently at the outboard side edge of the seat back.

In the preferred embodiment disclosed, a conventional seat back latch is fixed to the vehicle body package shelf, near the upper edge of the seat, and includes a release lever that moves generally parallel to the plane of the seat back. A spring biased release cable having a stiff center wire is attached at its inner end to the latch release lever and is routed along the seat back to an outer end near the outboard side edge of the seat back. The cable wire outer end is fixed to a cloth tether. The outer end of the release cable is contained in a cable mounting box that is fixed to the rear surface of the seat back, near the outboard side edge of the seat back. The cable mounting box provides several functions. It locates and guides the outer end of the cable, limiting its back and forth movement between a normal position and a latch release position. It also provides a specific guidance function for the pull tether. A quarter cylindrical tether guide runs from the plane of the seat back 90 degrees around the outboard side edge of the seat to an exit window that opens into the rear seat space of the car. The cloth tether loops around the quarter cylindrical guide and out the exit window to be easily accessed from the rear seat space. Pulling on the flexible tether translates the pull force 90 degrees into the stiff cable wire, which is co planar to the seat back, to release the seat back latch, despite is remote location from the outboard side edge of the seat back.

BRIEF DESCRIPTION OF THE DRAWINGS

These and other objects of the invention will appear from the following written description, and from the drawings, in which.

DESCRIPTION OF THE PREFERRED EMBODIMENT

Figure 1:
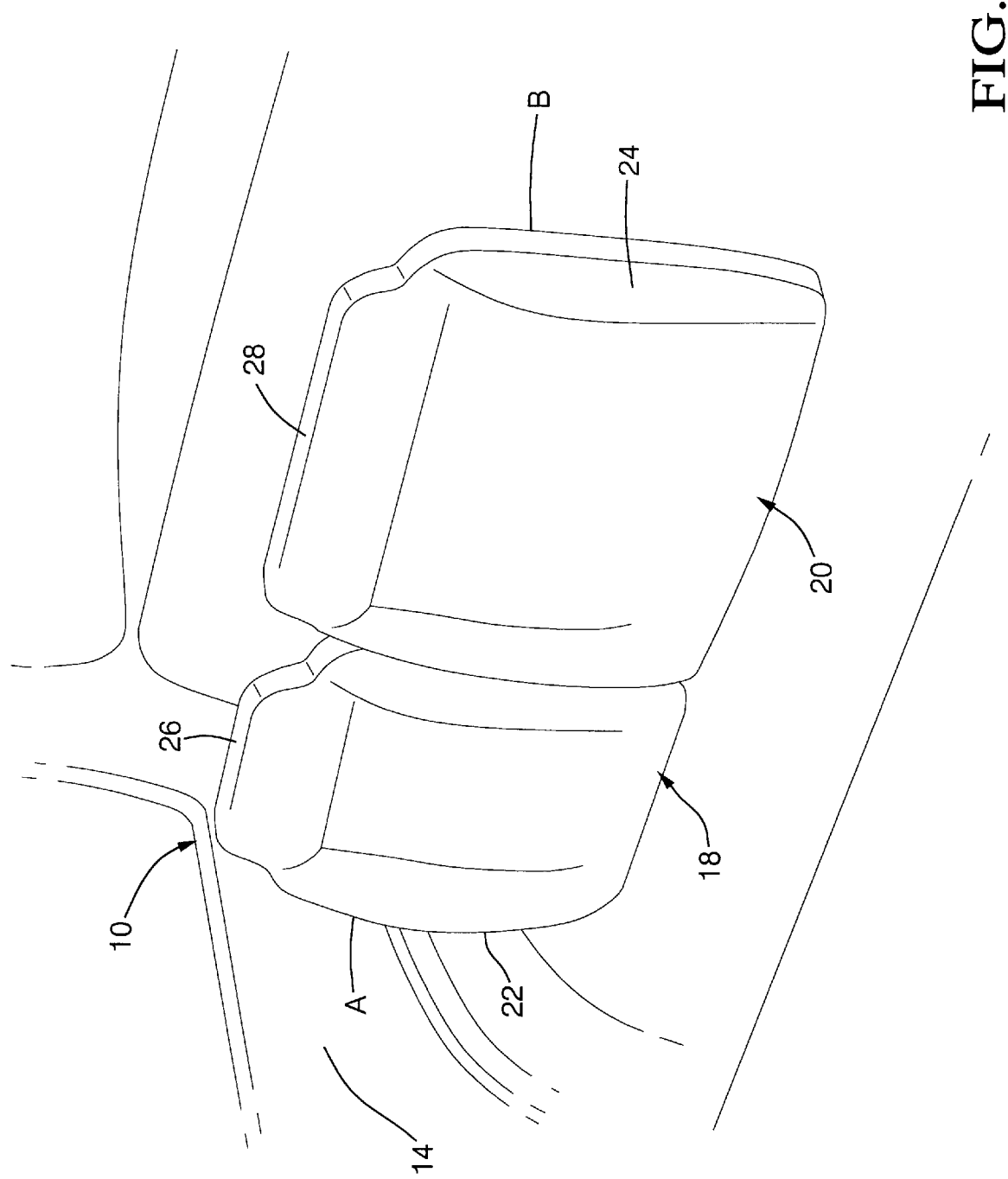
FIG. 1 is a simplified schematic sketch showing a pair of split, rear folding seat backs in the raised, latched position.
Figure 2:
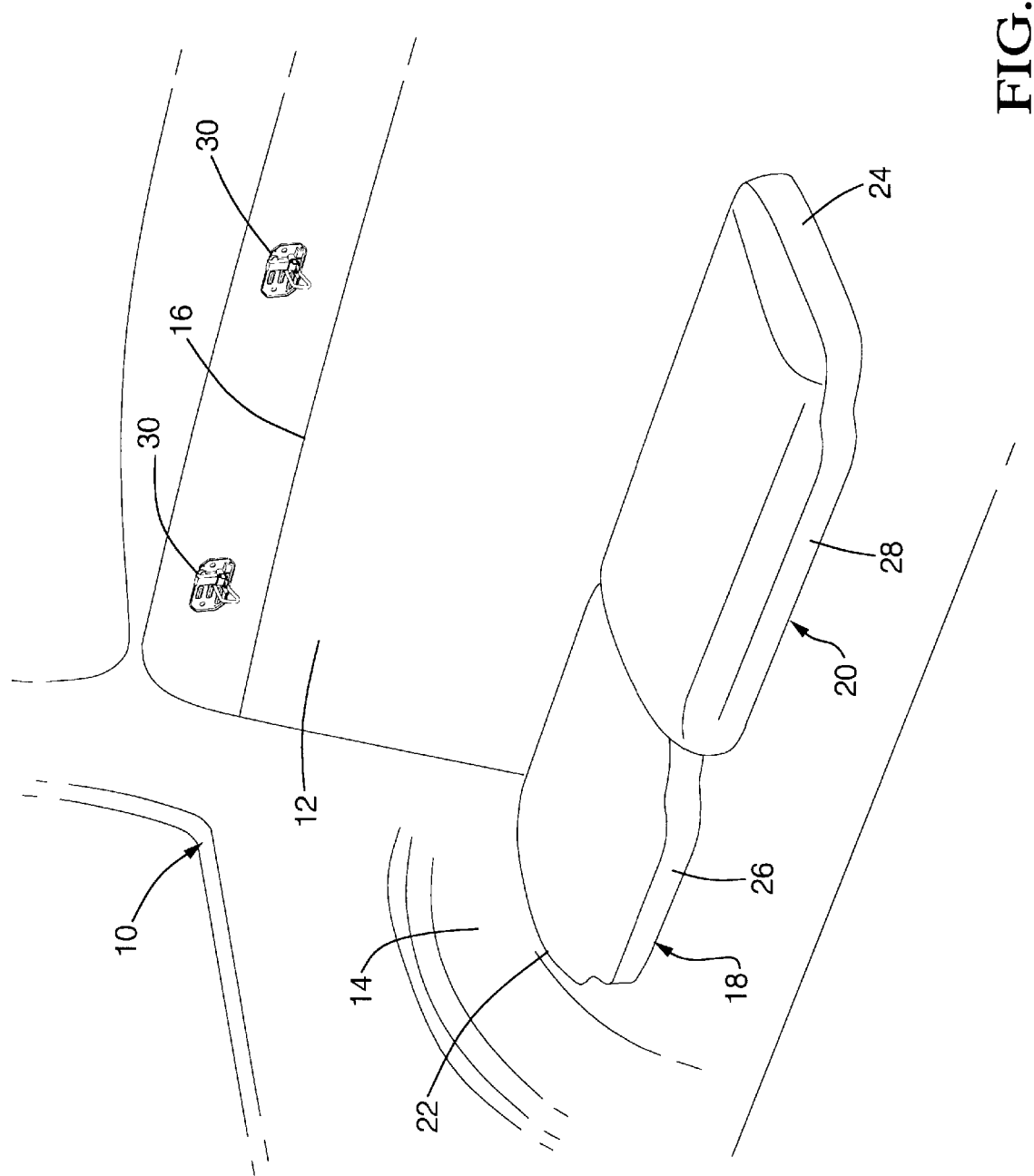
FIG. 2 is a view similar to FIG. 1, but showing the seat back folded down.

Referring first to FIGS. 1 and 2, a vehicle body indicated generally at 10 is divided into a trunk space 12 and a rear seat space 14, located generally to either side of a vehicle body cross member 16, typically referred to as a package shelf. The trunk space 12 is selectively blocked off or opened up by a pair of folding rear seat backs, a narrower seat back indicated generally at 18 and wider seat back indicated generally at 20. The rear seat backs 18 and 20 have opposed outboard side edges 22 and 24 respectively, and aligned upper edges 26 and 28 respectively. Each seat back 18 and 20 is cushioned and upholstered on the front, which material would wrap around both the upper edges 26, 28 and the outboard side edges 22, 24. Most of the rear surface of each seat back 18 and 20 would be uncushioned and fairly flat. In the raised position of the seat backs 18 and 20 shown in FIG. 1, the trunk space 12 and rear seat space 14 are closed off from one another. The rear surface of each seat back 18 and 20 rests against the shelf 16, with the upper edges 26 and 28 flush with or just above the shelf 16. In the lowered position shown in FIG. 2, each seat back 18 and 20 rests on the seat cushion, and the trunk space 12 is opened to the rear seat space 14. Either or both seat back 18 and 20 can be independently raised or lowered. Fixed to the inner surface of the package shelf 16 are a pair of identical latch strikers 30, to which each seat back 18 and 20 is independently latched by a conventional latch, described in more detail below. Each latch is mounted to a seat back 18 and 20 in a position that corresponds to the location of its striker 30, that is, on the seat back rear surface and near the upper edges 26 and 28. The strikers 30 are located on the shelf 16, in turn, so as to hold the seat backs 18 and 20 near the center of the seat back upper edges 26 and 28, or, at least remote from the outboard side edges 22 and 24, which is the optimum location for strong retention, as noted above. The strikers 30 also contain their own latch release mechanisms, not illustrated, which are operated by conventional exterior release mechanisms accessed only from the trunk space 12. A second, interior latch release, accessible from the rear seat space 14, is also desirable. Conventionally, this could consist of a rigid plunger which would be located right above the strikers 30, and therefore extending visibly up above the seat back upper edges 26 and 28. Or, the release mechanism could be a flexible cloth pull tether located at the outboard side edges 22 and 24, which would require that the latches also be located very near the same side edges 22 and 24, not the ideal location for seat back retention strength. Ideally, a flexible tether could be located at generally the points noted at A and B in FIG. 1, wrapping around the seat back side edges 22 and 24, and intruding only slightly physically into the rear seat space 14, with minimal visual impact or physical interference with the seat back upholstery. However, the latch should still be located remote from those same side edges 22 and 24.

Figure 3:
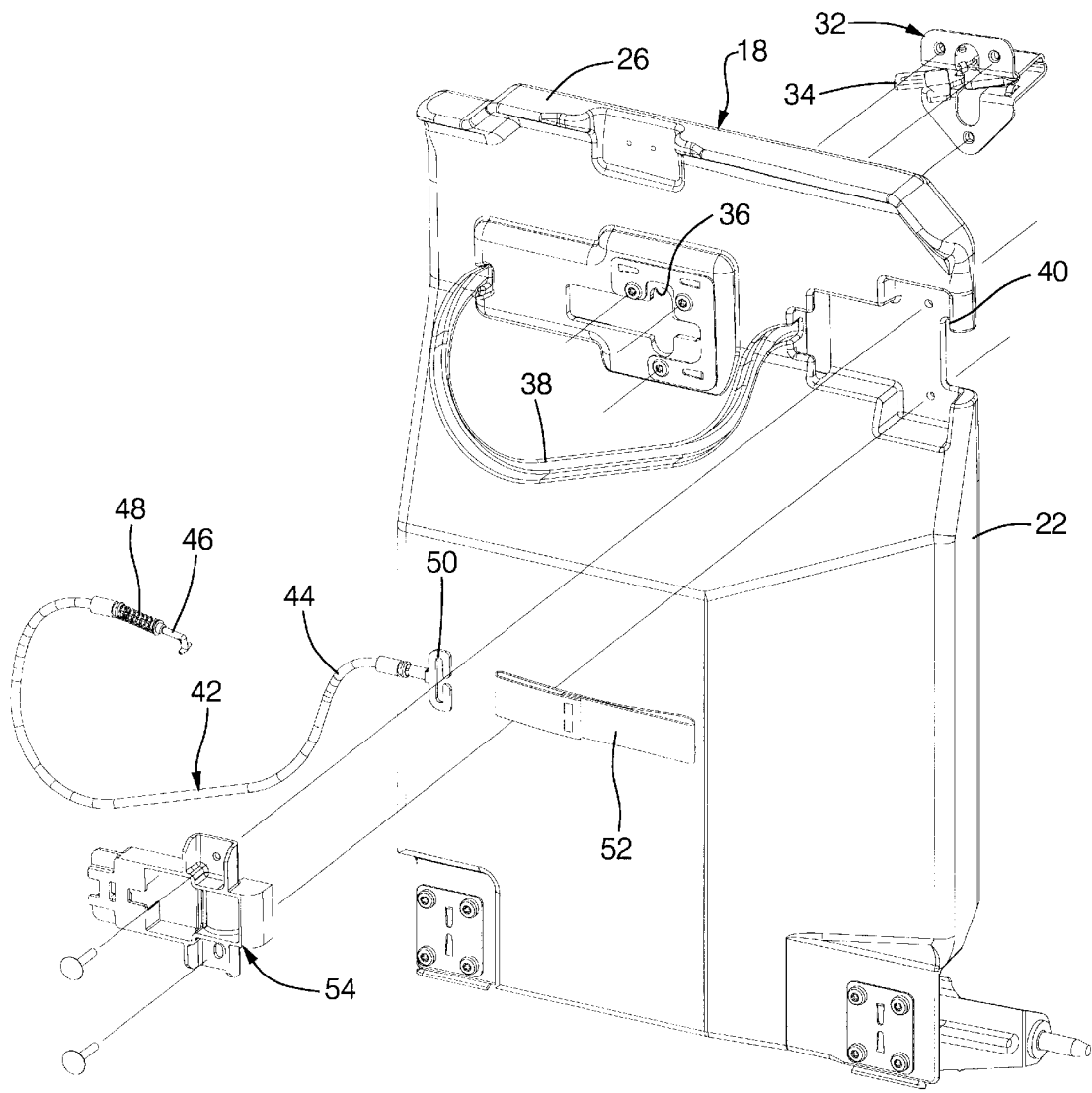
FIG. 3 is a perspective view of the rear of the narrower seat back, showing the various components of the latch release assembly disassembled.

Referring next to FIG. 3, the rear surface of the narrower seat back 18 is illustrated, along with disassembled components of the latch release assembly of the invention. The same basic release mechanism is used with the wider seat back 20, with some specific differences described further below. The generally flat rear surface of the narrower seat back 18, which is shown without the cushioned upholstery that wraps around its edges 22 and 26, serves as the structural foundation for several other components. A conventional latch, indicated generally at 32, automatically grasps the striker 30 when the seat back 18 is raised and pushed closed. Latch 32 can be released either by the exterior accessed cable release associated with striker 30, as noted above or, independently, by the interior accessed release assembly of the invention. Specifically, a latch release lever 34 is pulled and moves generally along the plane of the flat rear surface of the seat back 20, but away from the outboard side edge 22, thereby causing the latch 32 to open and release the striker 30. For the narrower seat back 18, the latch 32 is mounted in a shell 36 that puts it nearly at the center of seat back 18, near the upper edge 26. Because the latch release lever 34 moves away from the outboard side edge 22, a cable routing trough 38 turns around 180 degrees from the end of shell 36 and runs back to a cutout 40 of specific shape at the seat back outboard side edge 22. A jacketed cable indicated generally at 42, has an outer sleeve 44 that fits into trough 38 and through which a central wire 46 is slidably received. Wire 46 is substantially stiff, but it can be bent around gradually in the trough 38 and still operate, but cannot be bent sharply. An inner end of cable wire 46 extends out of an inner end of sleeve 44 and is adapted to be fixed to the latch release lever 34, and is also biased continually by a compression coil spring 48 outwardly from the sleeve 44. The outer end of wire 46 extends out of the outer end of sleeve 44 and is fixed to a flat, generally C shaped flat ring 50 that is perpendicular to wire 46. A flexible cloth, double end looped tether 52 has a width that allows it to be hooked into the ring 50. Therefore, assuming that the cable sleeve 44 is fixed somehow to the seat back 18, pulling straight on the tether 52 would pull the ring 50 and cable wire 46 farther out of sleeve 44, compressing the spring 48, and shifting the latch release lever 34. However, in this case, the tether 52 cannot be oriented so as to pull straight out, relative to the cable 42. Instead, the ideal position for the tether 52 is to wrap ninety degrees around the seat back outboard side edge 22, more or less perpendicular to the plane of the seat back 18. It is also required that the latch 32, being located away from the outboard seat back side edge 22, be released with a remote acting, stiff cable wire 46 that cannot wrap ninety degrees around the side edge 22. This design dilemma is resolved by another component of the invention, described in detail next.

Figure 6:
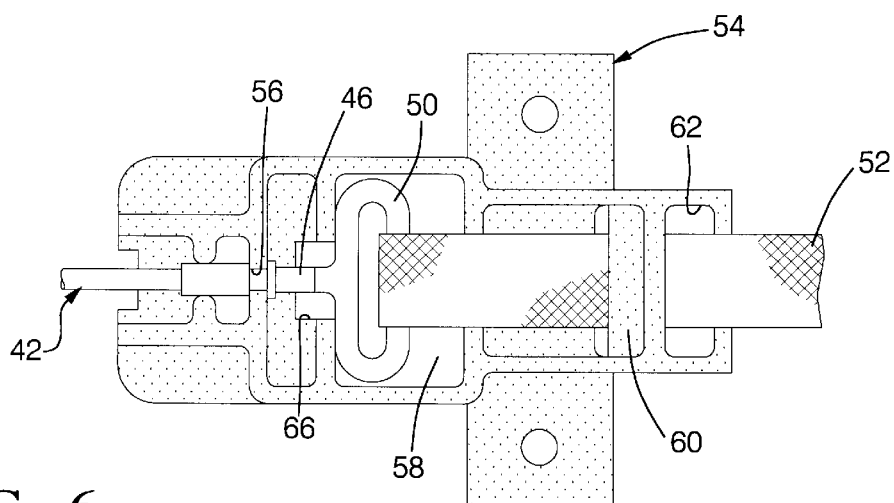
FIG. 6 is a plan view of the inner side of the cable mounting box with cable and tether installed thereto.
Figure 5:
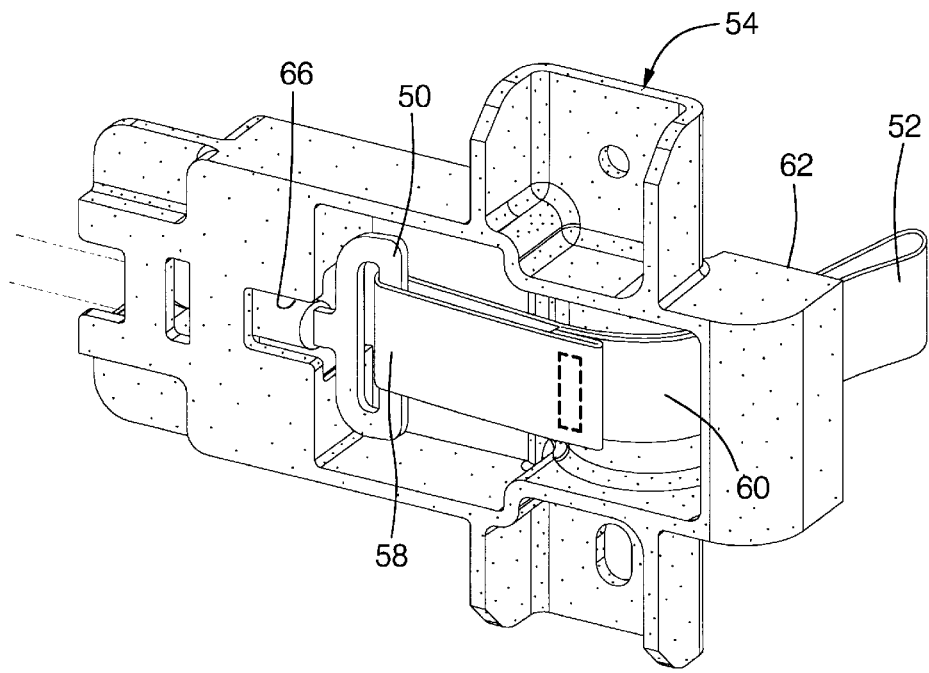
FIG. 5 is a perspective view of the outer side of the cable mounting box, cable and tether.

Referring next to FIGS. 5 and 6, a cable mounting box, indicated generally at 54, serves several functions. It mounts and guides the outer end of the cable 42 relative to the seat back 18, limits and defines its latch release motion, and allows the tether 52 to successfully operate within the limitations just noted above, as well as to be conveniently installed. Cable mounting box 54 is a rigid molded plastic part, shaped to be bolted closely into the seat back cutout 40 noted above, near the outboard side edge 22 and generally co planar the rear surface of seat back 18. FIG. 5 shows the outside of box 54, which would be visible once it was bolted into the cutout 40, and FIG. 6 shows its inside, which would abut the bottom of the cutout 40 and would not be visible after installation. At its inboard end, box 54 includes a key hole shaped notch 56 that crimps over the outer end of the cable sleeve 44 to hold it fixed. When cable sleeve 44 has been snapped into to notch 56, the flat ring 50 is contained within a double walled, substantially rectangular interior housing 58 that limits the back and forth movement of ring 50. At the outboard end of box 54, an integrally molded, quarter cylindrical tether guide 60 opens at its inner end to the housing 58, generally coplanar to the rear surface of seat back 18, but turns ninety degrees to an exit window 62. Being only a quarter cylinder, no part of the guide 60 overlaps with the window 62 or with the basic plane of box 54. Those skilled in the plastic molding art will recognize, especially from FIG. 6, that this lack of mutual overlap among structural features allows box 54 to be bypass molded by a single pair of dies that part along a line normal to the basic plane of box 54. The final installation of and operation of the tether 52 into box 54 are described next.

Referring next to FIGS. 1, 3 and 5, the seat back 18 is pre assembled as a module with every component of the latch release assembly except the tether 52. This allows the seat back 18 to be installed as a unit to vehicle body 10. As installed, the latch 32 is already fixed into the shell, and the cable 42 runs through the routing trough 38 to the cable mounting box 54, which is bolted into the cutout 40. With the outer end of cable sleeve 44 snapped into the notch 56, the cable spring 48 continually pulls wire 46 inward and keeps ring 50 against the inner wall of housing 58. In that normal, biased position, latch release lever 34 is deactivated. The seat back installer attaches the tether 52 as a last step. The tether guide 60 wraps around the seat back outboard side edge 22, so that the exit window 62 opens into the rear seat space 14 and is accessible from the front of the seat back 18. The installer can choose a cloth tether 52 that is color coordinated with the upholstery color of the seat back 18, and feed it from the front through the exit window 62, around the guide 60 and into the interior of housing 58, as shown in FIG. 5. The outside of housing 58 is open, so the ring 50 can therefore be accessed and pulled partially out of the housing 58, at least far enough to be removably hooked into the ring 50. This is not to say that the tether 52 would be removed from the ring 50 thereafter, merely that it is not fixed thereto ahead of time, and can be added to or removed from ring 50 as desired as a last, deliberate step. A clearance notch 66 can be added to box 54 just inboard of ring 50, if desired, to provide extra cable clearance when pulling ring 50 out. When installation is complete, the outer end of tether 52 leaves exit window 62 and extends around the seat back side outboard side edge 22, entering the rear seat space 14 at point A. It will be visually and physically unobtrusive, as compared to a rigid plunger extending above the seat back upper edge 26, and will have minimal effect on the seat upholstery. When a back seat occupant pulls out on the exposed end of the tether 52, in a direction substantially perpendicular to the seat back 18, the force of the pulling motion is translated ninety degrees by the tether guide 60, pulling the ring 50. The cable wire 46 is pulled through the sleeve 44 until the ring 50 hits the far wall of the housing 58, defining a release position. This compresses the spring 48 and shifts the remotely located latch release lever 34 along the plane of the seat back 18 far enough to release the latch 32. The curve of the cable routing trough 38 is gradual enough to allow the center wire 46 to slide smoothly, as noted, but the center wire 46 need not make a sharp ninety degree turn around the side edge 22.

Figure 4:
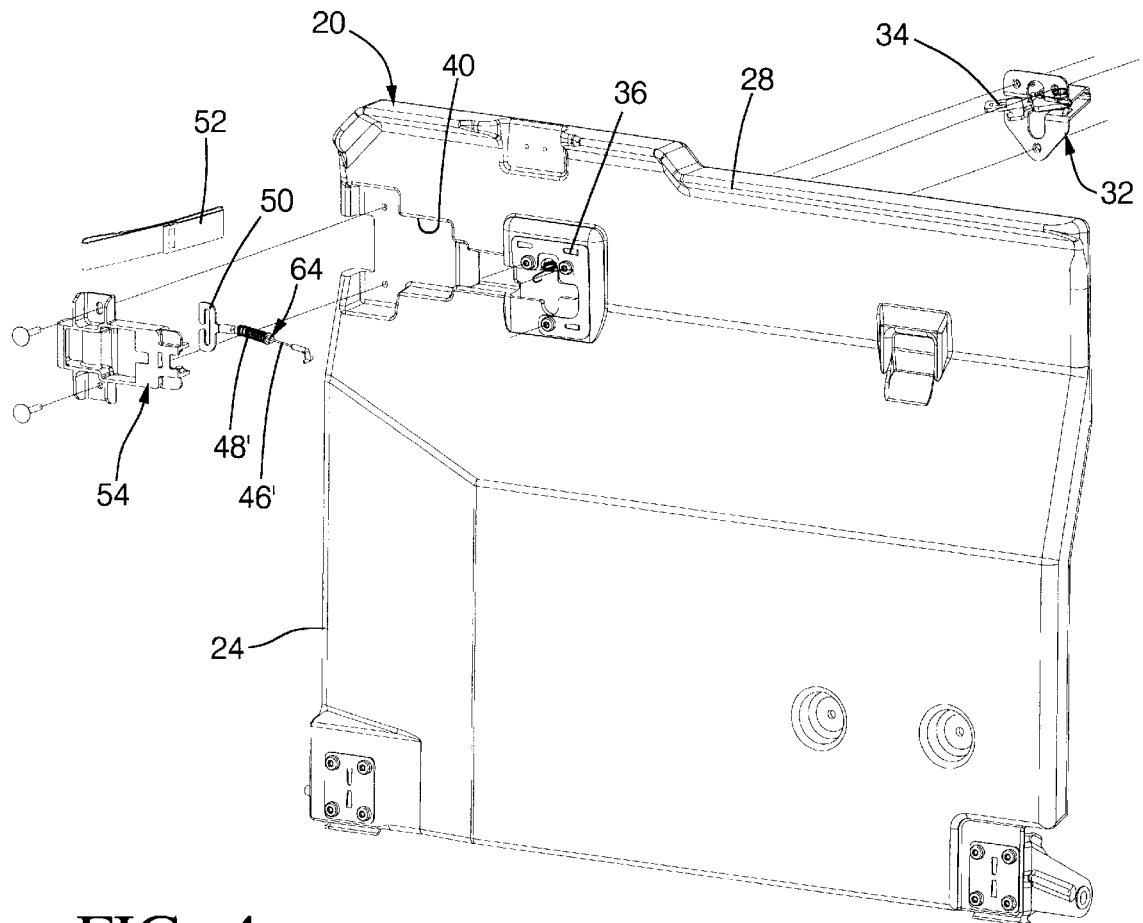
FIG. 4 is a view similar to FIG. 3, but showing the wider seat back.

Referring next to FIGS. 1 and 4, the latch release assembly embodiment incorporated in the wider seat back 20 is basically the same as the narrower seat back 18, and can be described very briefly. Several components are identical and given the same number. The latch 32 and its mounting shell 36 are the same, as are the cable mounting box 54 and its cutout 40. The tether 52 is identical also, but the fact that the latch release lever 34 moves toward, rather than away from the outboard side edge 24 means that a much shorter, straight run release cable 64 can be used, with no routing trough 38. Cable 64 is similar to 42, with a similar (but shorter) center wire 46' that needs no outer sleeve. The same ring 50 is attached to the outer end, and the inner end attaches to the latch release lever 34. Since the short center wire 46' needs no outer sleeve 44, its coil spring 48' is compressed directly between a fixed end fitting crimped to the wire 46' and a floating spring fitting that snaps into the same cable box notch 56. The tether 52 attaches to the ring 50 in the same way, extends into the rear seat space 14 at the point B in FIG. 1, and operates in the same fashion.

In summary, the integrally molded cable mounting box 54 attaches the release cable to the rear surface of the seat back 18, guides and limits its motion, and allows a pulling motion on a flexible tether 52 to be translated ninety degrees to effectively release a remotely mounted, conventional latch 32. In addition, in the embodiment disclosed, the open sided housing 58 within the box 54 allows a color matched tether 52 to be easily added as a last step to the otherwise complete modular release assembly. If it were not desired to removably attach the tether 52 as a last step, then it could be fixed more or less permanently to the outer end of the cable wire 46, without the C shaped flat ring 50. Then, the complete latch release assembly, with tether 52, could be shipped with the seat back as a module. Or, the same ring 50 could be attached to the tether 52 as a next to last step, and the box 54 itself bolted into the cutout 40 as a last step, thereby allowing the ring 50 to be encased within a closed housing in the box 54. The ring 50 as disclosed is particularly useful, however, both because it allows the tether 52 to be separately installed, and because it serves as a convenient stop member to limit the sliding path of the cable wire 46. Therefore, it will be understood that it is not intended to limit the invention to just the embodiment disclosed.

We claim:

1. In an automotive vehicle body having a rear seat space, a rear storage space located behind said rear seat space, a generally planar fold down rear seat back having an upper edge and an outboard side edge, said seat back having a raised, latched position separating said rear storage space from said rear seat and a lowered, unlatched position opening said rear storage space to said rear seat, an improved rear seat back latch release assembly accessible from said rear seat space, comprising;

a vehicle body rear cross member located behind and along said seat back upper edge, a latch fixed to said rear seat back near its upper edge and remote from its outboard side edge, said latch engageable with said rear cross member, said latch also having a release member that moves substantially parallel to the plane of said rear seat back, a spring biased release cable having a substantially stiff wire fixed at an inner end to said latch release member and extending along said seat back to an outer end near its outboard side edge, a release cable mounting box attached to said seat back through which said wire is slidably mounted and having a (semi) quarter cylindrical tether guide near said seat back outboard side edge that turns substantially ninety degree from the plane of said seat back toward said rear seat space, and, a flexible tether fixed to said cable wire outer end and looped around said tether guide to extend past said seat back outboard side edge and into said rear seat space, so that an occupant of said rear seat space can access said tether, pull thereon, and thereby translate the pulling force ninety degrees and into said cable wire to release said remote mounted latch.

2. In an automotive vehicle body having a rear seat space, a rear storage space located behind said rear seat space, a generally planar fold down rear seat back having an upper edge and an outboard side edge, said seat back having a raised, latched position separating said rear storage space from said rear seat and a lowered, unlatched position opening said rear storage space to said rear seat, an improved rear seat back latch release assembly accessible from said rear seat space, comprising;

a vehicle body rear cross member located behind and along said seat back upper edge, a latch fixed to said rear seat back near its upper edge and remote from its outboard side edge, said latch engageable with said rear cross member, said latch also having a release member that moves substantially parallel to the plane of said rear seat back, a spring biased release cable having a substantially stiff wire fixed at an inner end to said latch release member and extending along said seat back to a ring located near its outboard side edge, a release cable mounting box attached to said seat back through which said wire is slidably mounted and having a housing within which said ring is located and a (semi) quarter cylindrical tether guide near said seat back outboard side edge that turns substantially ninety degree from the plane of said seat back toward said rear seat space, and, a flexible tether removably attached to said ring and looped around said tether guide to extend past said seat back outboard side edge and into said rear seat space, so that an occupant of said rear seat space can access said tether, pull thereon, and thereby translate the pulling force ninety degrees and into said ring and cable wire to release said remote mounted latch.

3. In an automotive vehicle body having a rear seat space, a rear storage space located behind said rear seat space, a generally planar fold down rear seat back having an upper edge and an outboard side edge, said seat back having a raised, latched position separating said rear storage space from said rear seat and a lowered, unlatched position opening said rear storage space to said rear seat, an improved rear seat back latch release assembly accessible from said rear seat space, comprising;

- a vehicle body rear cross member located behind and along said seat back upper edge,
- a latch fixed to said rear seat back near its upper edge and remote from its outboard side edge, said latch engageable with said rear cross member, said latch also having a release member that moves substantially parallel to the plane of said rear seat back,
- a spring biased release cable having a substantially stiff wire fixed at an inner end to said latch release member and extending along said seat back to a substantially flat ring oriented substantially perpendicularly to said wire and located said seat back outboard side edge,
- a release cable mounting box attached to said seat back through which said wire is slidably mounted and having an open housing in which said ring moves back and forth over a limited path and a (semi) quarter cylindrical tether guide near said seat back outboard side edge that turns substantially ninety degree from the plane of said seat back toward said rear seat space, and,
- a flexible tether removably attached through said open housing and to said ring and looped around said tether guide to extend past said seat back outboard side edge and into said rear seat space, so that an occupant of said rear seat space can access said tether outer end, pull thereon, and thereby translate the pulling force ninety degrees and to move said ring back and forth within the limits of said housing walls to move said cable wire and release said remote mounted latch.

* * * * *